Figure 3:
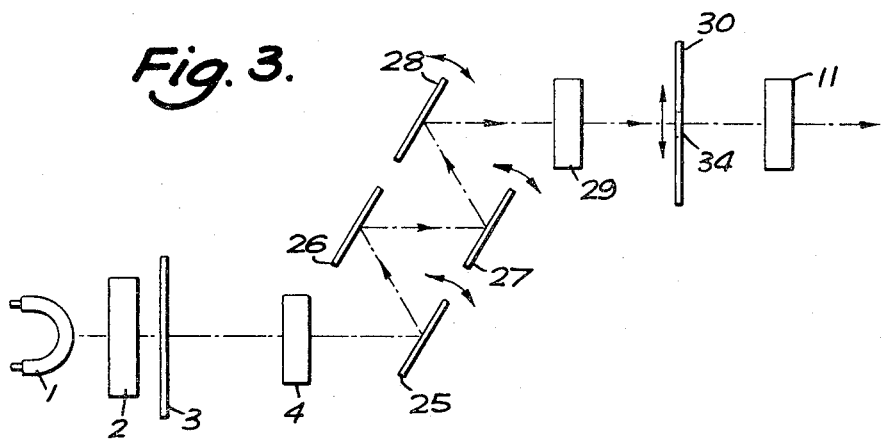

United States Patent [19]
England

[11] 3,733,979
[45] May 22, 1973

[54] PHOTOCOMPOSING APPARATUS

[75] Inventor: Charles John England, Smallfield, England

[73] Assignee: The Monotype Corporation, London, England

[22] Filed: July 8, 1971

[21] Appl. No.: 160,847

[30] Foreign Application Priority Data

July 14, 1970 Great Britain..................34,069/70

[52] U.S. Cl..............................................95/4.5
[51] Int. Cl..............................................B41b 17/12
[58] Field of Search..................................95/4.5

[56] References Cited

UNITED STATES PATENTS

| | | | |
|---|---|---|---|
| 3,492,926 | 2/1970 | Asaeda | 95/4.5 |
| 3,330,191 | 7/1967 | King | 95/4.5 |
| 2,900,884 | 8/1959 | Coleman | 95/4.5 |
| 1,702,195 | 2/1929 | Centeno | 178/7.6 |

Primary Examiner—John M. Horan
Attorney—George B. Finnegan, Jr. et al.

[57] ABSTRACT

Photo-composing apparatus comprising a matrix of master characters, an optical system for forming a light beam bearing images of all the characters in the matrix, a lens for collimating the light beam, a second optical system for directing an image of a selected master character on to a photo-sensitive member, and at least one rotatable scanning mirror disposed in the path of the collimated beam to direct a selectable portion of the collimated beam into the second optical system. The second optical system includes a lens for forming a focused image of the characters in the matrix, in the plane of a mask which has an aperture sufficient to encompass the image of only one character.

2 Claims, 4 Drawing Figures

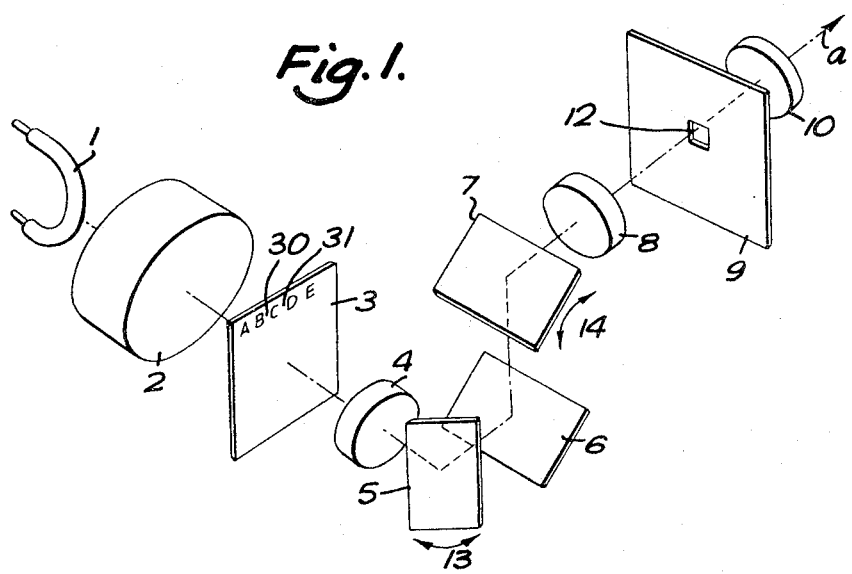
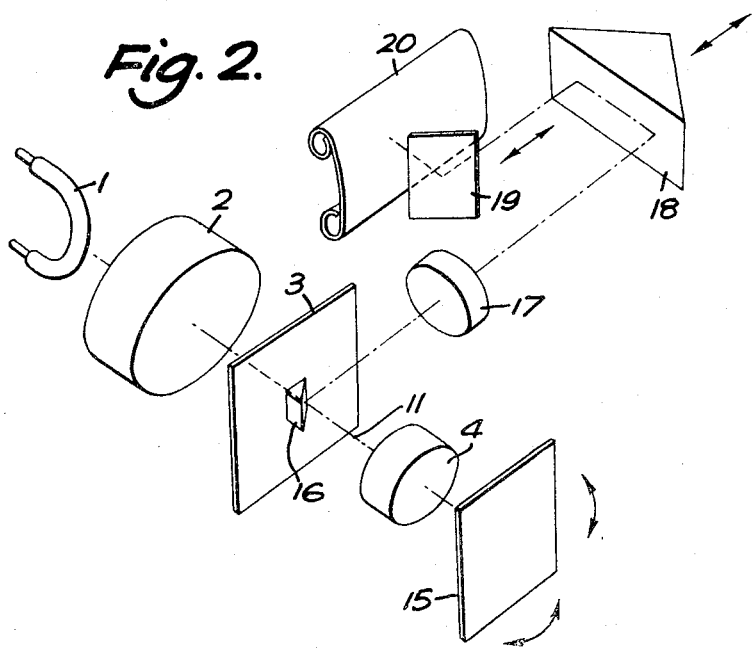

PHOTOCOMPOSING APPARATUS

This invention relates to photo-composing apparatus in which images of selectable master characters in a matrix are projected on to a photo-sensitive member. The invention is particularly concerned with the control of the selection of the characters for projection.

It has been the practice to provide a fixed optical path between a light source and an optical system for directing a beam from the source towards the photo-sensitive member, and by movement of a carrier for a matrix of character transparencies to move the characters in the matrix selectively into the path of the light beam. This usually requires a carrier or carriers rotatable at high speeds.

It has been proposed to employ a relatively fixed matrix and to control the selection of characters optically by movement of reflecting or refracting members disposed in the optical path extending from the matrix to the projection system. However, these proposals have, by virtue of the use of refracting members or the disposition of reflecting members in the path of a diverging beam led to a loss of focus in the projected image of characters any substantial distance away from the centre of the matrix.

According to the invention, photo-composing apparatus comprises a matrix of master characters, an optical system for forming a light beam bearing images of all the characters in the matrix, a collimator for collimating the light beam, a second optical system for directing an image of a selected master character on to a photo-sensitive member, and for controlling the selection of the selected master character, at least one rotatable scanning mirror disposed in the path of the collimated beam to direct a selectable portion of the collimated beam into the second optical system.

The disposition of the rotatable scanning mirror or mirrors in a part of the light path where the light is collimated very substantially assists in the retaining of focus of the character image which is formed on the photo-sensitive member no matter from which part of the matrix the portion of the light beam bearing this image comes.

There may be a single scanning mirror rotatable in two orthogonal planes for directing the selectable portion of the collimated beam into the second optical system. Alternatively however there may be provided two scanning mirrors rotatable in respective planes which are orthogonal with respect to the collimated light beam.

A further possibility consists in the provision of two or more scanning mirrors disposed one after the other so that the selection in any given direction across the matrix depends on the movement of all the scanning mirrors.

In order to assist in the projection of but a single character image at a time there may be provided in the path of the light beam after the rotatable mirror or mirrors a means for forming a focused image of the characters in the matrix and a mask or other means (such as a mirror) with a limited aperture disposed in the region of the focused image to allow the projection onto the photo-sensitive member of the image of a single selected character. For example there may be a mask having an aperture in the plane of which the light beam is brought to a focus with an image of the selected character spanning the aperture: Alternatively a reflector (reflecting prism or mirror) of such a size to encompass one character image only may be provided in place of or in addition to the mask.

Figure 4:
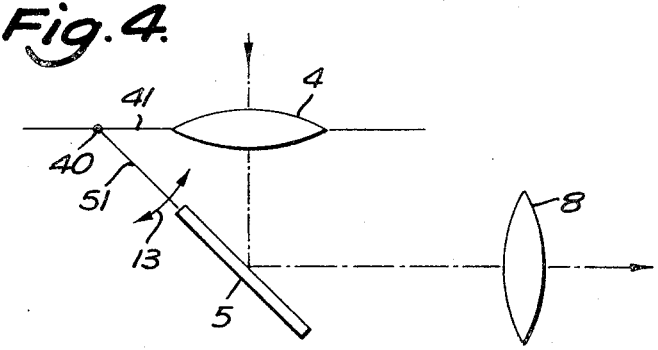

Reference hereinafter will be made to the accompanying drawings of which:

FIG. 1 illustrates one embodiment of the invention;
FIG. 2 illustrates an alternative embodiment of the invention;
FIG. 3 illustrates another embodiment of the invention; and
FIG. 4 illustrates a preferred arrangement of part of the invention.

The embodiments illustrated in the drawings show only the principal parts of the optical system for a photo-composing apparatus. Associated mechanisms such as a keyboard, tape reader, mechanisms for controlling the various movable parts of the optical systems etc., have been omitted for the sake of simplicity.

Referring to FIG. 1, a light source 1 provides at appropriate times light which is collected by a condenser lens 2 so as to illuminate evenly a fixed matrix 3 having an array of master characters 30, 31 etc., formed for example as photographic transparencies. A light beam bearing, by virtue of the even illumination of all the array, images of all the characters on the array is projected at a collimator in the form of a collimating lens 4. The collimated beam from the lens 4 is deflected by a pivoted scanning mirror 5 on to a rectifying fixed mirror 6 whence it is deflected again towards a second pivoted scanning mirror 7 from which it is directed through a lens 8 that brings the beam into focus in the plane of an aperture 12 in a plate 9. The focused image is an image of all the characters in the array and one single character image, the particular character being selected by the positions of the mirrors 5 and 7, is projected by means of a further lens 10 in the direction of an arrow $a$ through a suitable set feed mechanism (see FIG. 2 for one example thereof) to a photo-sensitive member whereon it is brought to a focus. The lenses 4 and 8 are set to give an object-image ratio of unity. Moreover the lens 4 has an aperture sufficient to encompass a light beam from all parts of the array 3 and accordingly the lens 8 projects an image of all the array 3 on to the plate 9. Rotation of the mirror 5 about a vertical axis, as shown by the arrows 13, causes the displacement of the projected image on the plate 9 in a horizontal direction whereas rotation of the mirror 7 as shown by the arrows 14 causes the displacement of the image in an orthogonal direction, in this case the vertical direction. Accordingly by the combined rotation of the mirrors 5 and 7 the image of any selected character on the array can be directed into the aperture 12 whereas unwanted images are masked off by the plate 9. It is important to note that light entering the lens 4 from the array 3 is collimated and the collimation of the light in the path between the lens 4 and the lens 8 flattens the field of view so that any selected part of the array 3 is in focus on the plate 9. The rectifying mirror 6 ensures that the projected images of the array 3 traverse the plate 9 in rectilinear co-ordinate directions rather than arcs in the vertical plane as they would in the absence of the mirror 6.

FIG. 2 illustrates another embodiment of the invention. This embodiment has as before a light source 1, conveniently in the form of a flash tube, from which light is collected by the condenser lens 2 and projected evenly through the matrix 3. The light beam from the matrix is collimated by the lens 4 and directed towards a mirror 15 which is rotatable in two orthogonal planes. The reflected light from the mirror 15 re-transverses the lens 4 and is brought to a focus in the plane of the matrix array 3 at the centre of which a mirror 16, of which the aperture is sufficient to encompass one character image only, projects a portion of the beam, determined by the orientation of the mirror 15, through an image sizing lens 17 that projects the beam carrying the selected character image through a set feed system comprising a prism 18 and a mirror 19 to a film 20. The prism 18 and mirror 19 are movable at a predetermined speed and at twice that speed respectively transverse the film 20 which is itself traversable longitudinally so that successive lines of photo-composition can be built up.

The lens 4 is set in relation to the matrix array 3 so that images of the characters in the array are brought to a focus, with a unity object to image ratio, in the plane of the matrix array.

As is implied hereinbefore, to select the required character from the array 3 the mirror 15 is rotatable in two planes in order to move the projected image of the matrix array in both co-ordinate directions. Once again the collimation of the light rays between the lens 4 and the mirror 15 flattens the field of view so that any part of the image of the array is in focus. The reflecting prism or mirror 16 is of such a size as to encompass one character image only and accordingly the image of but a single, selected, character at a time is ultimately projected on to the film 20.

Referring now to FIG. 3, the condenser lens 2 collects light from a light source 1 and evenly illuminates a fixed matrix array 3. A light beam comprising images from all parts of the array 3 is collimated by the collimating lens 4 whence the collimated beam is deflected successively by pivoted mirrors 25, 26, 27 and 28 from the last of which the light beam is projected through a lens 29 which brings the beam into focus in the plane of a mask 30 having an aperture 34.

The lens 4 and the lens 29 are set to given an object to image ratio of unity between the characters of the matrix 3 and the image that is formed at the aperture 34. Accordingly a whole image of the array 3 is projected on to the plate 30. The mirrors 25, 26, 27 and 28 have respective deflection factors which are multiples of a fundamental factor associated with the moving of the focused image of the array by one position namely to substitute in the aperture 34 the image of a character by the image of the character next to it on the array 3. The mirrors 26, 27 and 28 have deflection factors of 2, 4 and 8 respectively and by combining the movements of these mirrors any character in a row of 16 characters can be selected. The mirrors 25, 26, 27 and 28 are also pivoted so as to be rotatable in an orthogonal plane and accordingly selection of any character from a column of 16 is possible. Thus the image which is brought to a focus at the plate 30 can be made to move up and down as well as from side to side and by the combined deflections of all the mirrors 25, 26, 27 and 28 an image of any selected character of the matrix array 3 can be projected into the aperture 34 while the plate 30 masks off all the unwanted images. Once again the light beam passing through the system of rotatable mirrors is collimated so that the image of any selected character 3 is brought to a proper focus in the plane of the plate 30.

All the three embodiments described can employ a fixed character array which can readily be automatically changed. By incorporating, preferably, a flat array the system may be readily adapted to existing film setters.

The light source may be any of the ordinary types used for illuminating a matrix. In general the drive of the mirrors may be via mechanical, electro-mechanical or other mechanisms, preferably including stepping motors, the selection of successive characters being conveniently controlled from a pre-recorded tape in a manner analogous to that used for the selection of characters in an ordinary photo-composing machine.

FIG. 4 illustrates a preferred arrangement of a scanning mirror(such as the mirror 5)and the collimator (such as the collimating lens 4). If the mirror rotates about an axis through the centre of the lens 4 then if the mirror is rotated to select a character away from the centre of the matrix then the corresponding part of the collimated beam will enter the second optical system, illustrated by the lens 8, off the axis thereof. This can cause severe fringing of the image produced. The fringing may be substantially avoided by causing the mirror 5 to rotate as shown by the double arrow 13 about an axis 40 which is along the line of intersection of the plane 51 of the mirror 5 and the posterior principal plane 41 of the lens 4. This arrangement can be used for any other rotatable mirror used in the selection of the master character and avoids the use of expensive apochromatic process lenses.

I claim:

1. Photo-composing apparatus comprising a matrix of master characters, an optical system for forming a light beam bearing images of all the characters in the matrix, a collimator for collimating the light beam, a second optical system for directing an image of a selected master character on to a photo-sensitive member, and at least one rotatable scanning mirror disposed in the path of the collimated beam to direct a selectable portion of the collimated beam into the second optical system; the second optical system comprising means for forming a focused image of the characters in the matrix, and means with a limited aperture disposed in the region of the focused image to allow the projection onto the photo-sensitive member of the image of a single selected character, said means with a limited aperture comprising a reflector of such a size to encompass a single character image.

2. Photo-composing apparatus comprising a matrix of master characters, a first optical system for forming a light beam bearing images of all the characters in the matrix, a collimator for collimating the light beam, a second optical system for directing an image of a selected master character on to a photosensitive member and for controlling the selection of the selected master character, at least one rotatable scanning mirror disposed in the path of the collimated beam to direct a selectable portion of the collimated beam into said second optical system, said first optical system comprising a lens, and said scanning mirror being rotatable about an axis along the intersection of the plane of the mirror and the posterior principal plane of said lens.

* * * * *